United States Patent
Suzuki (10) Patent No.: US 7,472,212 B2
(45) Date of Patent: Dec. 30, 2008

(54) MULTI CPU SYSTEM

(75) Inventor: Katsunari Suzuki, Yokohama (JP)

(73) Assignee: Canon Kabushiki Kaisha (JP)

(*) Notice: Subject to any disclaimer, the term of this patent is extended or adjusted under 35 U.S.C. 154(b) by 167 days.

(21) Appl. No.: 11/397,485

(22) Filed: Apr. 4, 2006

(65) Prior Publication Data

US 2006/0224806 A1    Oct. 5, 2006

(30) Foreign Application Priority Data

Apr. 4, 2005    (JP) ............................. 2005-107921

(51) Int. Cl.
*G06F 12/00* (2006.01)
(52) U.S. Cl. .................. 710/200; 710/108; 710/312
(58) Field of Classification Search ................ 710/108, 710/200, 312
See application file for complete search history.

(56) References Cited

U.S. PATENT DOCUMENTS

| | | | | |
|---|---|---|---|---|
| 4,419,724 A | * | 12/1983 | Branigin et al. ............ 710/108 |
| 4,636,942 A | * | 1/1987 | Chen et al. .................. 710/269 |
| 4,754,398 A | * | 6/1988 | Pribnow ..................... 709/226 |
| 4,805,098 A | * | 2/1989 | Mills et al. .................. 711/118 |
| 5,050,072 A | * | 9/1991 | Earnshaw et al. ........... 710/108 |
| 5,167,022 A | * | 11/1992 | Bahr et al. .................. 710/108 |
| 5,175,829 A | * | 12/1992 | Stumpf et al. ............... 712/203 |
| 5,353,414 A | * | 10/1994 | Iida et al. ................... 710/108 |
| 5,394,551 A | * | 2/1995 | Holt et al. .................. 710/200 |
| 5,469,575 A | * | 11/1995 | Madduri ..................... 709/226 |
| 5,581,782 A | * | 12/1996 | Sarangdhar et al. ......... 710/119 |
| 5,774,731 A | * | 6/1998 | Higuchi et al. .............. 710/200 |
| 6,549,961 B1 | * | 4/2003 | Kloth ......................... 710/36 |
| 6,839,811 B2 | * | 1/2005 | Fujiyama ................... 711/141 |
| 7,315,913 B2 | * | 1/2008 | Takizawa .................... 710/312 |

FOREIGN PATENT DOCUMENTS

JP    05-020279 A    1/1993

OTHER PUBLICATIONS

Birrell et al. Synchronization Primitives for a Multiprocessor: A Formal Specification. Digital Equipment Corporation, Systems Research Center. ACM 089791-242-X/87/0011/0094 1987.*
Molesky et al. Predictable Synchronization Mechanisms for Multiprocessor Real-Time Systems. The Journal of Real-Time Systems, 2, 163-180. 1990.*
Lortz et al. Semaphore Queue Priority Assignment for Real-Time Multiprocessor Synchronization. IEEE Transactions On Software Engineering. vol. 21, No. 10, Oct. 1995.*

* cited by examiner

*Primary Examiner*—Mark Rinehart
*Assistant Examiner*—Matthew D Spittle
(74) *Attorney, Agent, or Firm*—Rossi, Kimms & McDowell LLP (57) ABSTRACT

A multi CPU system is capable of performing exclusive control of a plurality of CPUs accessing to the same resource by a hardware without depending on an OS. The plurality of CPUs are connected with the same system bus. A plurality of circuits one-to-one correspond to each of the plurality of CPUs and comprise respective semaphore acquisition registers. Each of the CPUs in accessing to the resource is controlled, based on the value written in the semaphore acquisition register of the corresponding circuit, the presence or absence of the priority in the semaphore control, and a semaphore signal received from the another circuit.

9 Claims, 7 Drawing Sheets

MULTI CPU SYSTEM

BACKGROUND OF THE INVENTION

1. Field of the Invention

This invention relates to a multi CPU system in which a plurality of CPUs are connected with the same system bus.

2. Description of the Related Art

Conventionally, in the multi CPU system in which a plurality of CPUs are connected with the same system bus, there is used, in order to perform exclusive control of each CPU accessing to the same resource on a system bus, a method for performing the control using an OS (Operating System) or a method for causing each CPU to check a semaphore flag prepared in a memory which is commonly accessible from each CPU before performing a bus access (for example, see Japanese Laid-Open Patent publication (Kokai) No. H05-020279).

The conventional method performed by using an OS, however, depends on the OS per se, which burdens softwares. In the method of preparing a semaphore flag in a memory which is commonly accessible to each CPU, there are caused problems that a time lag occurs when each CPU accesses to the memory, and that, in a case where the respective CPUs access to the semaphore flag simultaneously, the exclusive control cannot be performed.

SUMMARY OF THE INVENTION

An object of the present invention is to provide a multi CPU system which can perform exclusive control of a plurality of CPUs accessing to the same resource by a hardware without depending on an OS.

To attain the object, in a first aspect of the present invention, there is provided a multi CPU system in which a plurality of CPUs are connected with the same system bus, comprising a plurality of circuits which one-to-one correspond to each of the plurality of CPUs, wherein each of the plurality of circuits comprises a semaphore acquisition register in which a value indicating a write access is written when a corresponding CPU performs the write access to a resource on the system bus, a semaphore controlling unit that outputs a semaphore signal indicating that the corresponding CPU performs a write access based on the value written in the semaphore acquisition register and receives a semaphore signal from another circuit, to thereby perform semaphore control of the corresponding CPU, and a semaphore priority decision unit that determines the presence or absence of priority in the semaphore control to the corresponding CPU, wherein the semaphore controlling unit that controls the corresponding CPU in accessing to the resource, based on the value written in the semaphore acquisition register, the presence or absence of the priority in the determined semaphore control, and the semaphore signal received from the another circuit.

Preferably, the semaphore controlling unit permits the corresponding CPU to access to the resource, when not receiving the semaphore signal from another circuit.

Preferably, the semaphore controlling unit permits the corresponding CPU to access the resource, when the value indicating the write access is written in the semaphore acquisition register and the semaphore priority decision unit determines the presence of priority in the semaphore control to the corresponding CPU.

Preferably, the semaphore controlling unit inhibits the corresponding CPU to access the resource, when the value indicating the write access is not written in the semaphore acquisition register and the semaphore signal is received from the another circuit.

Preferably, the semaphore controlling unit inhibits the corresponding CPU to access the resource, when the value indicating the write access is written in the semaphore acquisition register and the semaphore signal is received from the another circuit, and the semaphore priority decision unit determines the absence of priority in the semaphore control to the corresponding CPU.

Preferably, each of the plurality of circuits queues a write command obtained at a write access to a command buffer and then issues the queued write command to the resource on the system bus in timing which is different from that of the corresponding CPU issuing the write command.

More preferably, each of the plurality of circuits determines whether or not the command buffer has a space at the write access, and if it is determined that the command buffer has no spaces, inhibits to write the write command until the command buffer makes a space.

More preferably, each of the plurality of circuits determines the accessing type of the write command at the write access, and decides whether or not the command buffer has a space of an amount according to the accessing type.

More preferably, each of the plurality of circuit issues a read command without through the command buffer to the resource on the system bus at a read access.

According to the present invention, it is capable of performing exclusive control of a plurality of CPUs accessing to the same resources by the hardware without depending on the OS.

Further, it is capable of causing a software of the respective CPUs to reserve a semaphore in the same procedure, respectively, though the semaphore acquisition registers of the respective CPUs are different in semaphore-acquiring procedure from each other depending on the presence or absence of the priority for each CPU and its semaphore-acquiring timing.

The above and other objects, features, and advantages of the invention will become more apparent from the following detailed description taken in conjunction with the accompanying with drawings.

DETAILED DESCRIPTION OF THE PREFERRED EMBODIMENTS

The embodiments of the present invention will be described below with reference to the drawings.

Figure 1:
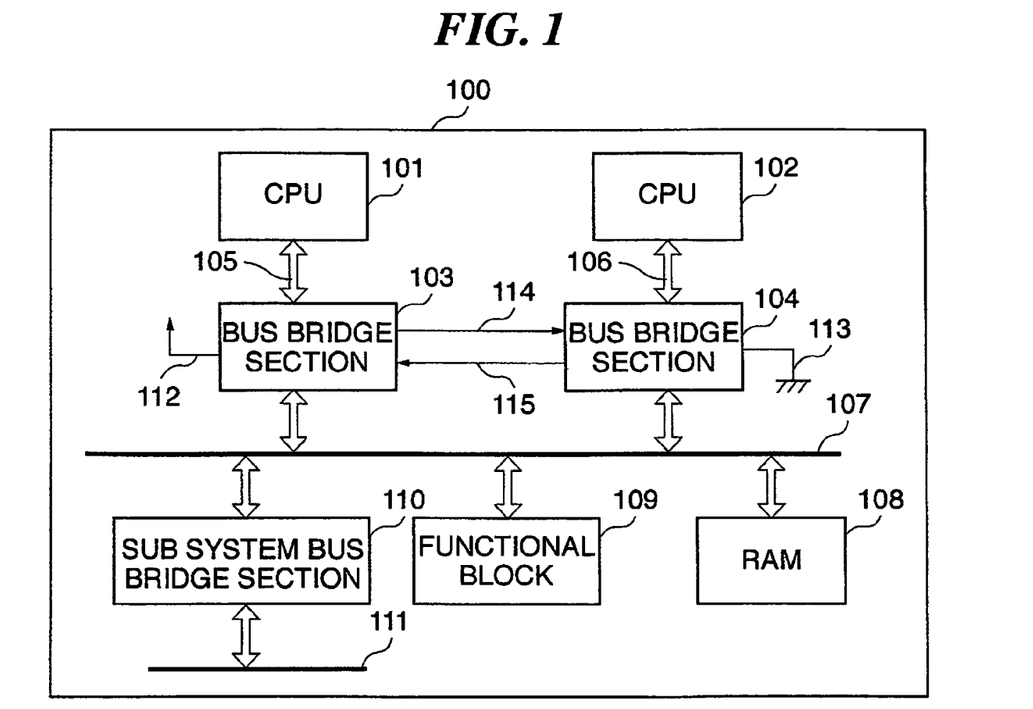
FIG. 1 is a block diagram showing the entire arrangement of a multi CPU system according to an embodiment of the present invention.

FIG. 1 is a block diagram showing the entire arrangement of a multi CPU system according to an embodiment of the present invention. For simplicity, a multi CPU system with two CPUs will be described.

The multi CPU system 100 has two CPUs 101 and 102 as shown in FIG. 1. The CPU 101, which is a main CPU, is connected with a bus bridge section 103 via a CPU bus 105. Each command issued from the CPU 101 is generated as a bus transaction on a CPU bus 105 and transferred to the bus bridge section 103. The CPU 102, which is a sub CPU, is connected with a bus bridge section 104 via a CPU bus 106. Each command issued from the CPU 102 is generated as a bus transaction on a CPU bus 106 and transferred to the bus bridge section 104. Each of the bus bridge sections 103 and 104 is connected with a system bus 107 and has a function of converting each of bus transactions from the CPU buses 105 and 106 into a transaction of the system bus 107. The system bus 107 is connected with a RAM 108, a functional block 109, and a sub system bus bridge section 110. Command/data is exchanged between the system bus 107 and each of blocks 108, 109, and 110 in a protocol of the system bus 107. The system bus 107 is connected with a sub system bus 111 via the sub system bus bridge section 110.

In a case where the CPU 101 and the CPU 102 simultaneously access the same resource on the system bus 107, for example, areas of the same address in the RAM 108 mentioned above. The CPU 101 has an access right of a higher priority, because the CPU 101 is a main CPU and the CPU 102 is a sub CPU. For this reason, the bus bridge section 103 which is one-to-one connected with the CPU 101 is connected with a signal line 112 (semaphore priority decision signal line), which is for designating that the CPU 101 is a main CPU, and the bus bridge section 104 connected with the CPU 102 is connected with a signal line 113 (semaphore priority decision signal line), which is for designating that the CPU 102 is a sub CPU.

In this embodiment, each of the bus bridge sections 103 and 104 has the same circuitry. Which of the bus bridge sections operates as a main CPU bus bridge or a sub CPU bus bridge can be automatically switched according to the state of signal lines 112 and 113 mentioned above. Here, as the signal line 112 to the bus bridge section 103 is connected with a predetermined positive potential VDD to thereby be in a state "1", the bus bridge section 103 operates as a main CPU bus bridge. The signal line 113 to the bus bridge section 104 is grounded to GND to thereby be in a state "0", the bus bridge section 104 operates as a sub CPU bus bridge. The bus bridge section 103 and the bus bridge section 104 are connected with each other via a pair of side band signal lines 114 and 115, and mutually monitor an object to be accessed on the system bus 107 by the opposite bus bridge section.

Figure 2:
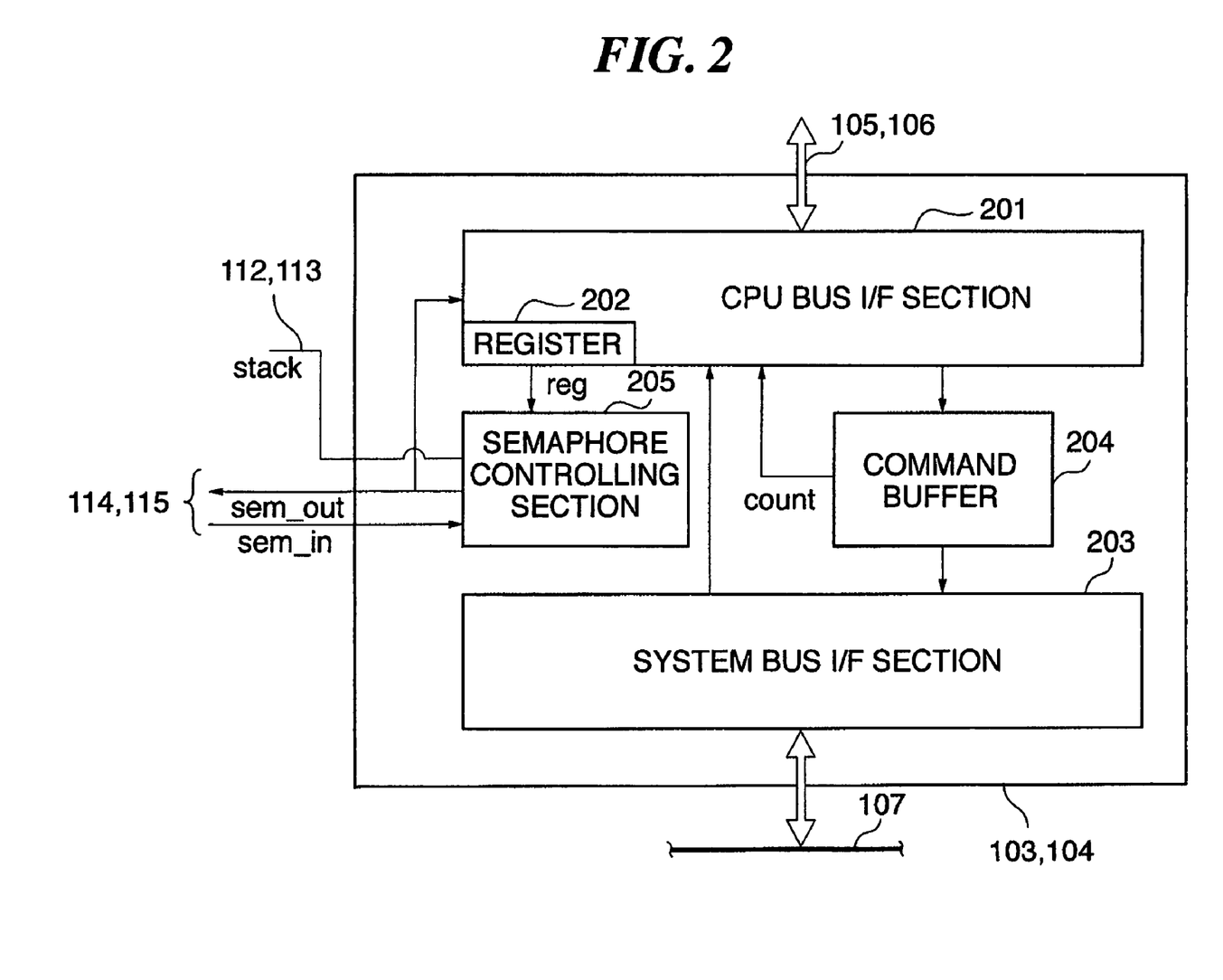
FIG. 2 is a block diagram showing an internal circuitry of the bus bridge sections 103 and 104 in FIG. 1.

Next, an internal circuitry of the bus bridge sections 103 and 104 will be described with reference to FIG. 2. FIG. 2 is a block diagram showing an internal circuitry of the bus bridge sections 103 and 104 in FIG. 1. As mentioned above, the bus bridge sections 103 and 104 have the same circuitry except for signals to be inputted or outputted. Therefore, reference numerals of signals and signal lines connected to the bus bridge section 103 are denoted without parentheses and reference numerals of signals and signal lines connected to the bus bridge section 104 are denoted with parentheses.

Each of the bus bridge sections 103 and 104 has a CPU bus I/F section 201, a system bus I/F section 203, a command buffer 204, and a semaphore controlling section 205 as shown in FIG. 2. The CPU bus I/F section 201 receives a transaction from the CPU bus 105 (106) and sends and receives command/data. The CPU bus I/F section 201 has a semaphore acquisition register 202 therein, and writes and reads to and from a value indicating that a CPU corresponding to the register 202 performs write access to resources on the system bus 107. Further, the CPU bus I/F section 201 controls writing of data into the command buffer 204. When a command from the CPU bus 105 (106) is a read command for resources on the system bus 107, the CPU bus I/F 201 transfers the command to the system bus I/F section 203 instead of sending it to the command buffer 204. The CPU bus I/F section 201 checks the count of commands currently stored in the command buffer 204. If the command buffer 204 is full, the CPU bus I/F section 201 causes the transaction on the CPU bus 105 to be stopped (106).

The system bus I/F section 203 is connected with the system bus 107 and outputs command/data by converting the protocol of a write command stored in the command buffer 204 into a protocol for the system bus 107, etc. In the case of read access, the system bus I/F section 203 converts the protocol of read data received from the system bus 107 into a protocol for the CPU bus 105 (106) and sends it to the CPU bus I/F section 201.

When a command from the CPU bus 105 (106) is a write command to the system bus 107, the command buffer 204 receives the write command and buffers it. The command buffer 204 has a capacity for four commands. If the command buffer 204 cannot output a command on the system bus 107 for some reason, it can queue up to four write commands.

Each of the bus bridge sections 103 and 104 in this embodiment is a bus bridge of a posted write system in which a transaction of the CPU bus 105 (106) can be reliably finished without waiting for the completion of write access to resources on the system bus 107 in the case of write access by temporally queuing only the write command in the command buffer 204. To this end, in the case of writing, as each of the bus bridge sections 103 and 104 need not wait for the completion of a CPU write operation, it can be expected to improve throughput of commands.

The semaphore controlling section 205 determines a value of an output side bind signal (sem_out) to be outputted on a side bind signal line 115 (114) based on a value (reg) set in a semaphore acquisition register 202, an input side bind signal (sem_in) on a side bind signal line 114 (115) and a state of a priority decision signal (stack) of the signal line 112 (113), and outputs the output side bind signal (sem_out) to another semaphore controlling section and the CPU bus I/F section 201 via the side bind signal line 115 (114).

Figure 3:
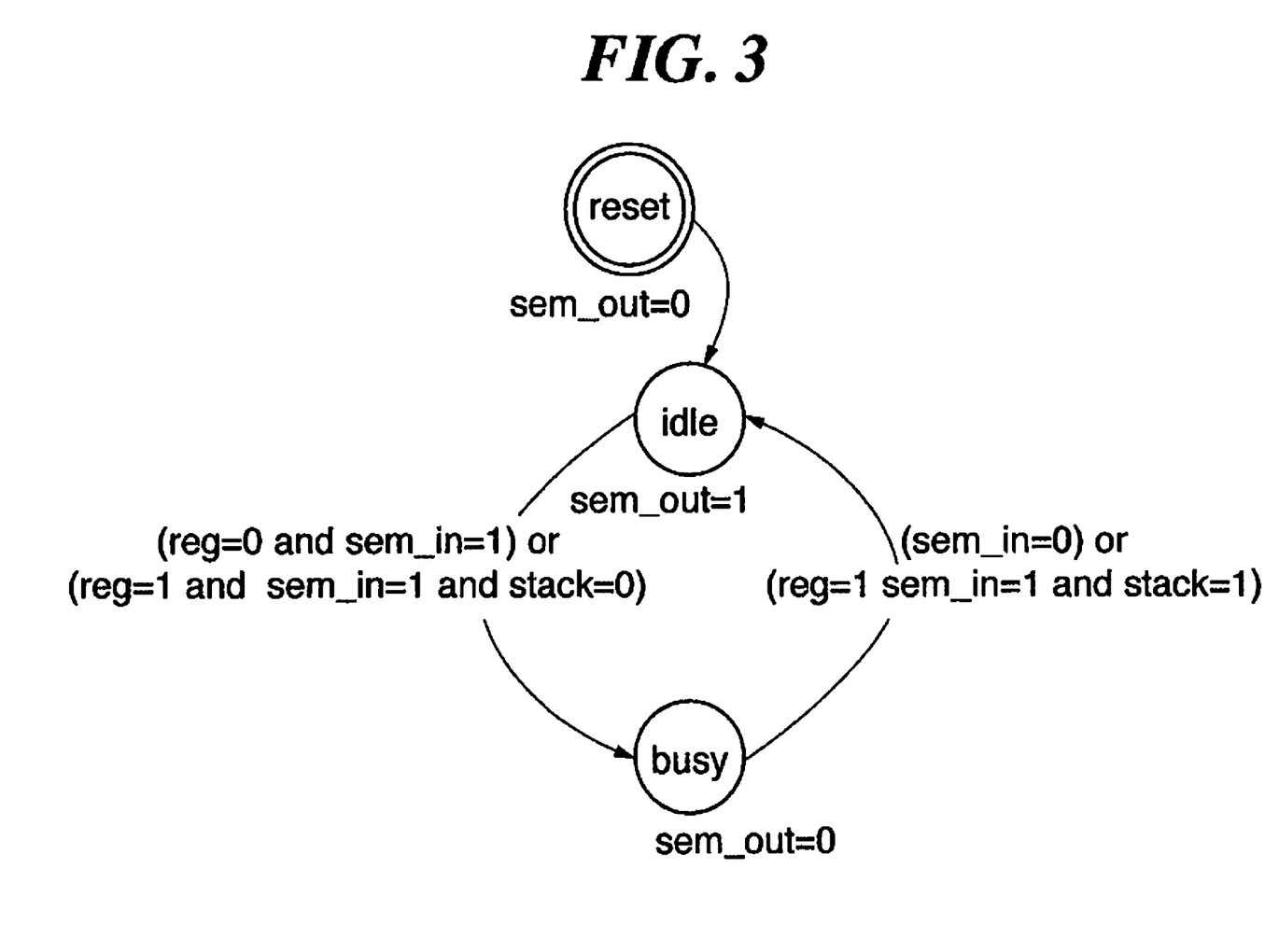
FIG. 3 is a state machine diagram showing the contents controlled by the semaphore controlling section 205 in FIG. 2.
Figure 4A:
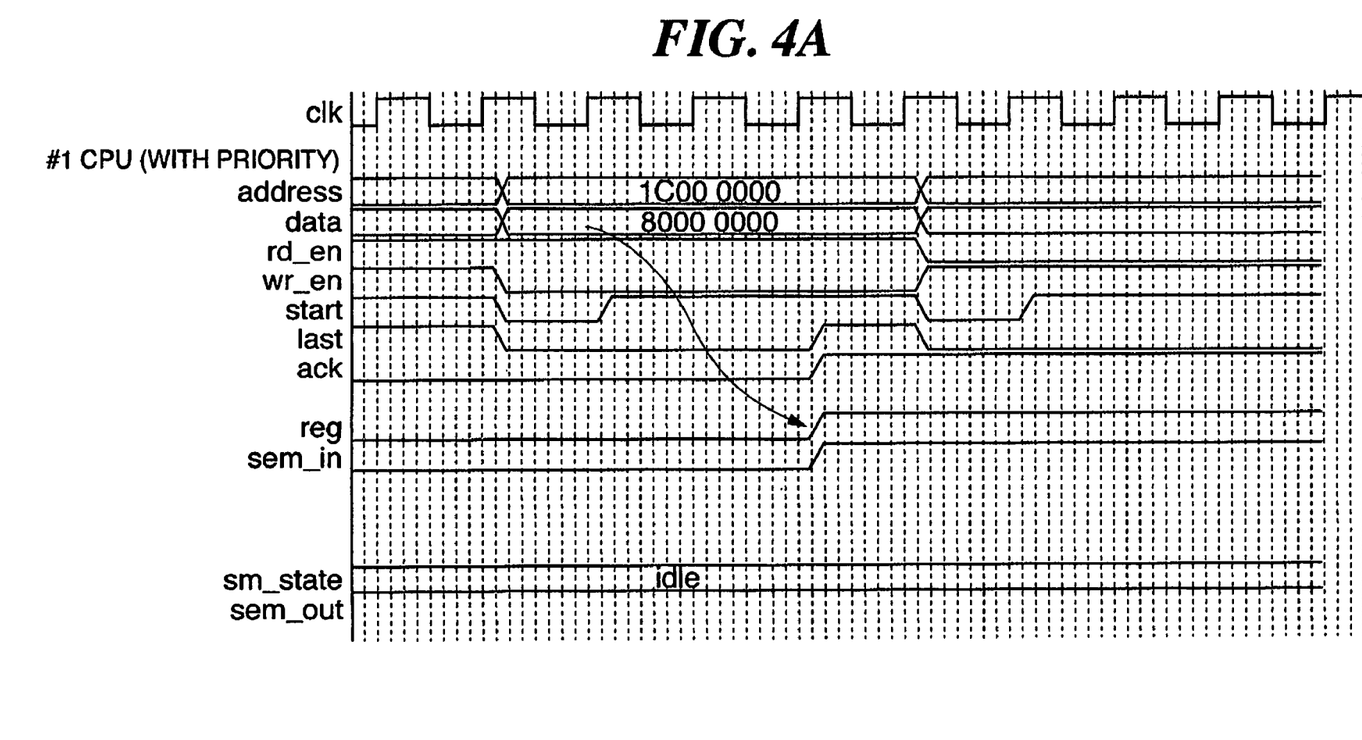
FIGS. 4A and 4B are timing charts exhibited when a CPU (with priority) and a CPU (Without priority) simultaneously start semaphore access.
Figure 4B:
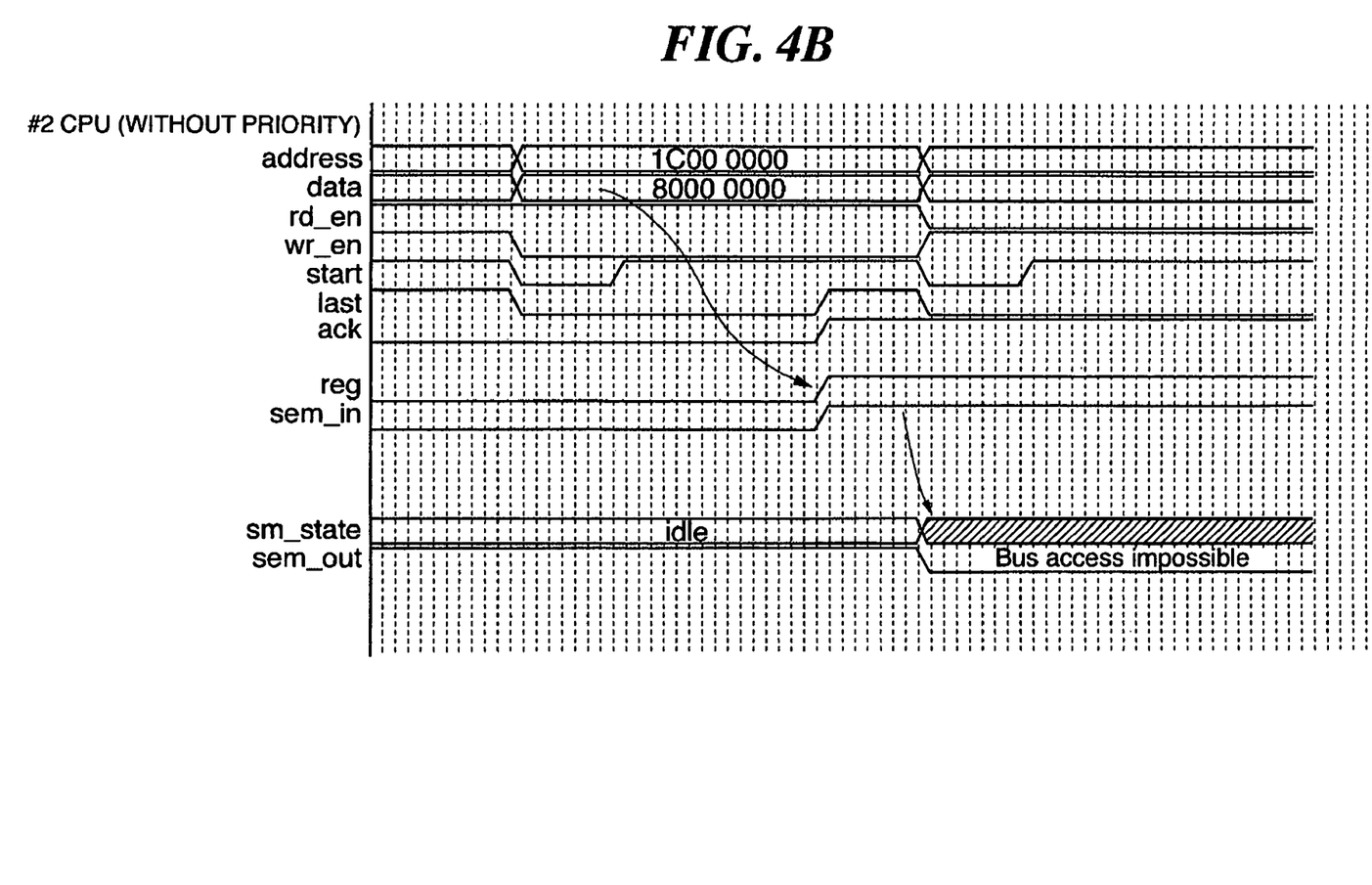

Next, there will be described a controlling manner of the semaphore controlling section 205 with reference to FIG. 3, and FIGS. 4A and 4B. FIG. 3 is a state machine diagram showing the contents controlled by the semaphore controlling section 205 in FIG. 2. FIGS. 4A and 4B are timing charts exhibited when a CPU (with priority) and a CPU (without priority) simultaneously start semaphore access.

As shown in FIG. 3, in an initial state, i.e., in a state shown as [reset], "0" is outputted as a sem_out signal. If sem_out=0 holds, a CPU corresponding to the bus bridge section cannot access resources on the system bus 107. Transferring from the [reset] state to the [idle] state is performed unconditionally. In the [idle] state, "1" is outputted as a sem_out signal. In this state, a CPU corresponding to the bus bridge section can access resources on the system bus 107.

If Conditions 1 mentioned below are established in the [idle] state, the state is transferred to the [busy] state.

Conditions 1: (reg=0 and sem_in=1) or (reg=1, sem_in=1 and stack=0)

As the former condition (reg=0 and sem_in=1) in the Conditions 1 mentioned above is a condition where another CPU issues a semaphore acquisition request when the CPU itself has not set the semaphore acquisition register 202 (i.e., the CPU itself has not issued a semaphore acquisition request), the state is transferred to the [busy] state which is a semaphore acquisition state.

As the latter condition (reg=1, sem_in=1 and stack=0) is a condition where another CPU has issued a semaphore acquisition request and the CPU itself has set the semaphore acquisition register 202, evaluation on whether the CPU itself has a priority or not needs to be done, and the state is transferred to the [busy] state as in the case where the CPU itself has no priority (stack=0 holds).

In the [busy] state, "0" is outputted as a sem_out signal. In this state, a CPU corresponding to the bus bridge section cannot access an area on the system bus 107. If Conditions 2 described below are established in this state, the state is transferred to the [idle] state.

Conditions 2: (sem_in=0) or (reg=1, sem_in=1 and stack=1)

As the former condition in the Conditions 2 mentioned above is for the case where another CPU has not issue a semaphore acquisition request, the CPU corresponding to the bus bridge is able to freely access the system bus 107. Therefore, the state is transferred to the [idle] state.

As the latter condition is a condition where another CPU has issued a semaphore acquisition request and the CPU itself has set semaphore acquisition register 202, evaluation on whether the CPU itself has a priority or not needs to be done. Here, if the CPU itself has a priority (stack=1 holds), the CPU itself can acquire a semaphore as ignoring a semaphore acquisition request from another CPU and the state is transferred to the [idle] state. If another CPU has issued no semaphore acquisition request (sem_in=0), the state is transferred to the [idle] state according to the former condition. Therefore, the latter condition may be a state where the CPU itself merely has set the semaphore acquisition register 202 (reg=1) whatever the conditions of another CPU are, and the CPU itself has a priority (stack=1 is established).

When a CPU (with priority) and a CPU (without priority) simultaneously start semaphore access as mentioned above, the CPU (with priority) is changed from in sm_state to in the [busy] state on the way and thereafter the CPU (without priority) is inhibited to access a resource on the system bus 107, as shown in FIGS. 4A and 4B.

Figure 5A:
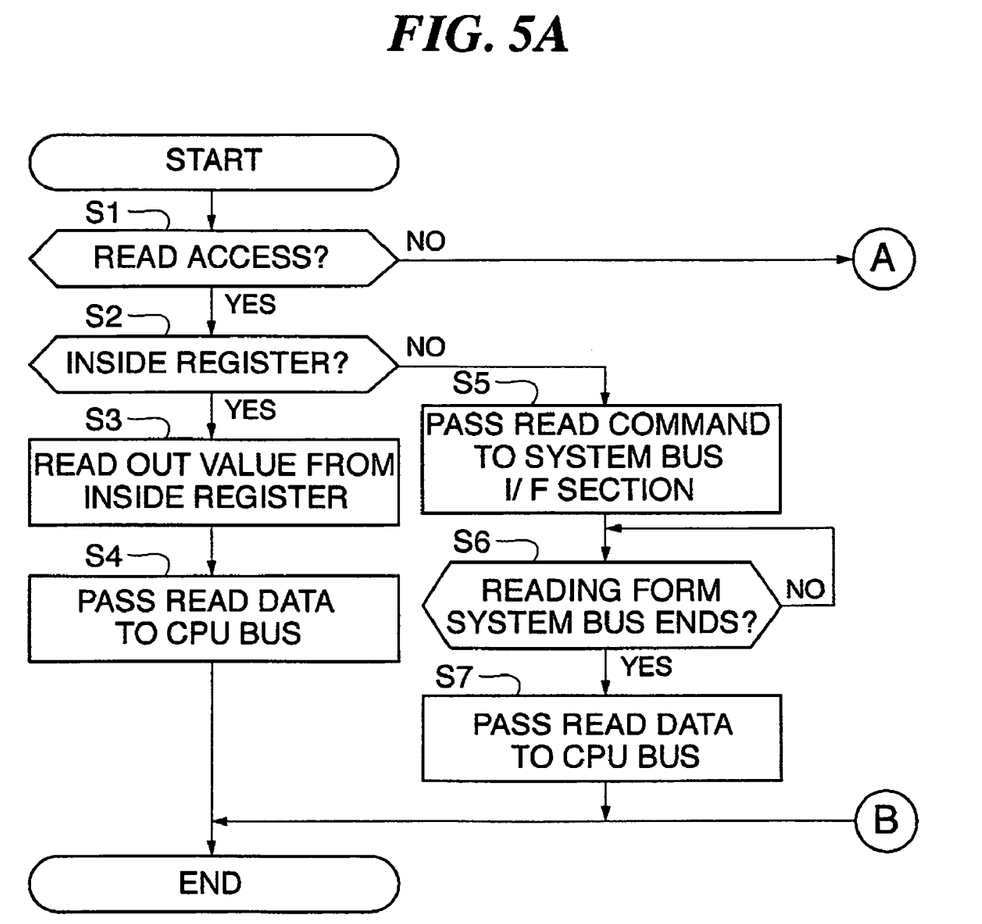
FIGS. 5A and 5B are flowcharts showing a controlling procedure of the CPU bus I/F section 201 in FIG. 2.
Figure 5B:
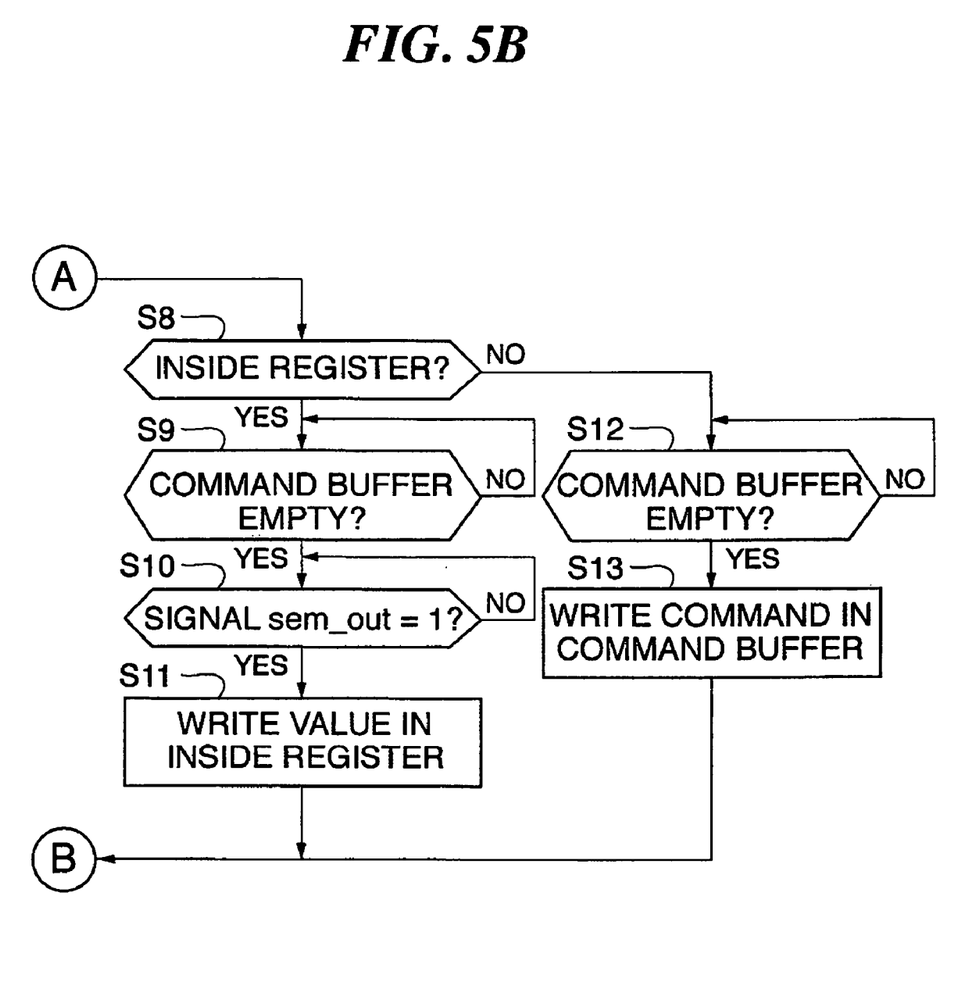

Next, there will be described a controlling manner of the CPU bus I/F section 201 with reference to FIGS. 5A and 5B. FIGS. 5A and 5B are flowcharts showing a procedure of a controlling manner of the CPU bus I/F section 201 in FIG. 2.

When the CPU bus I/F section 201 receives a command from the CPU bus 105 (106), the CPU bus I/F section 201 determines whether the received command is a read command or a write command, in step S1, as shown in FIG. 5A. If the received command is determined as a read command, an access is a read access and the CPU bus I/F section 201 determines whether the access is an access to an inside semaphore acquisition register 202 based on an address value of a read command, in step S2.

If the access is determined as an access to the semaphore acquisition register 202 in step S2 mentioned above, the CPU bus I/F section 201 starts reading operation for the semaphore acquisition register 202 and reads out a value set for the semaphore acquisition register 202, in step S3. Next, the CPU bus I/F section 201 sends a value read from the semaphore acquisition register 202 to the CPU bus 105 (106), in step S4, followed by terminating the program.

If the access is determined as not an access to the semaphore acquisition register 202 in step S2 mentioned above, the CPU bus I/F section 201 determines that the access is a read access to the system bus 107, and then, in step S5, passes a read command to the system bus I/F section 203. In step S6, the CPU bus I/F section 201 waits until read data is returned from the system bus I/F section 203. In step S7, when the read data is returned, the CPU bus I/F section 201 sends the read data to the CPU bus 105 (106), followed by terminating the program.

If the received command is determined as a write command in step S1 mentioned above, the access is a write access and the CPU bus I/F section 201 determines whether the access is a write access to an inside semaphore acquisition register 202 based on the address value of the command, in step S8, as shown in FIG. 5B. If the access is determined as an access to the semaphore acquisition register 202, the CPU bus I/F section 201 waits until a command buffer 204 makes a space in step S9. That is for preventing a write command to be protected using the semaphore exclusive control by the CPU from being not protected. This is because writing in the semaphore acquisition register 202 carried out when the command buffer 204 has not a space causes the contents of the semaphore acquisition register 202 to be rewritten, though there is a write command to be sent to the system bus 107.

When the command buffer 204 has a space, the CPU bus I/F section 201 waits until the sem_out signal becomes "1" in step S10. If the sem_out signal is "0", the other CPU acquires a semaphore and the CPU bus I/F section 201 waits until the other CPU releases the semaphore, i.e., the sem_out signal becomes "1". When the sem_out signal becomes "1", the CPU bus I/F section 201 writes write data included in the received write command into the semaphore acquisition register 202, followed by terminating the program.

If the access is determined as not a write access to the semaphore acquisition register 202, i.e., determined as a write access to the system bus 107, in step S8 mentioned above, the CPU bus I/F section 201 waits until the command buffer 204 has an empty space in step S12. Actually, whether the write command is for a single access or a burst access is determined at this time. If the write command is determined as for a single access, whether the command buffer 204 has one or more spaces is determined. If the write command is determined as for a burst access, whether the command buffer 204 has a space for a write command is determined. In either case, if the command buffer 204 has a necessary space, the CPU bus I/F section 201 writes the received write command into the command buffer 204 in step S13, followed by terminating the program. That is to say, in this embodiment, the write access ends when the write command is written in the command buffer 204 in the posted write system.

As such, by accessing the semaphore acquisition register 202 immediately before and immediately after the access to the system bus 107, the CPU can reliably and automatically perform exclusive processing on the write command to resources on the system bus 107, which is sandwiched by the two times of accesses to the semaphore acquisition register 202.

In this embodiment, the exclusive control between two CPUs is described for simplicity. It is a matter of course that the principle of the present invention can be applied to a multi CPU system which uses three or more CPUs. In such a case, signals for designating priority (stack) needs to be added and transferring conditions of a state machine of the semaphore controlling section 205 needs to be changed in the arrangement mentioned above.

This application claims the benefit of Japanese Application No. 2005-107921, filed Apr. 4, 2005, which is hereby incorporated by reference herein in its entirety.

What is claimed is:

1. A multi CPU system in which a plurality of CPUs are connected to a same system bus, comprising:
   a plurality of semaphore circuits each corresponding one-to-one to one of said plurality of CPUs,
   wherein each of said plurality of semaphore circuits comprises:
   a bus unit that determines an accessing type of access from the corresponding CPU;
   a stack that holds information on a predetermined priority level of the corresponding CPU;
   a semaphore register in which a value indicating whether or not the corresponding CPU has a semaphore to be written; and
   a semaphore controlling unit that is communicably connected to at least another semaphore controlling unit of the plurality of semaphore circuits and controls the semaphore of the corresponding CPU;
   wherein said semaphore controlling unit outputs a semaphore acquisition request to the at least another semaphore controlling unit and controls the semaphore of the corresponding CPU based on the information held by said stack, the presence or absence of the semaphore acquisition request from the at least another semaphore controlling unit, and the value written in said semaphore register, when said bus unit determines the accessing type as a write access to a resource on said system bus.

2. A multi CPU system according to claim 1, wherein said semaphore controlling unit causes a value indicating that the corresponding CPU has the semaphore to be written in said semaphore register, when not receiving the semaphore acquisition request from the at least another semaphore controlling unit.

3. A multi CPU system according to claim 1, wherein said semaphore controlling unit causes a value indicating that the corresponding CPU has the semaphore to be written in said semaphore register, when the predetermined priority level of the corresponding CPU is higher than that of another CPU associated with the semaphore circuit of the at least another semaphore controlling unit, based on the information held by said stack.

4. A multi CPU system according to claim 1, wherein said semaphore controlling unit causes a value indicating that the corresponding CPU does not have the semaphore to be written in said semaphore register, when the semaphore acquisition request from the at least another semaphore controlling unit is received.

5. A multi CPU system according to claim 1, wherein said semaphore controlling unit causes a value indicating that the corresponding CPU does not have the semaphore to be written in said semaphore register, when the semaphore acquisition request from the at least another semaphore controlling unit is received and the predetermined priority level of the corresponding CPU is lower than that of another CPU associated with the semaphore circuit of the at least another semaphore controlling unit.

6. A multi CPU system according to claim 1, wherein each of said plurality of semaphore circuits queues a write command obtained at a write access to a command buffer and then issues the queued write command to the resource on said system bus in timing which is different from that of the corresponding CPU issuing the write command.

7. A multi CPU system according to claim 6, wherein each of said plurality of semaphore circuits determines whether or not said command buffer has a space at the write access, and if said command buffer is determined to have no space, inhibits to write the write command until said command buffer makes a space.

8. A multi CPU system according to claim 7, wherein each of said plurality of semaphore circuits determines the accessing type of the write command at the write access, and decides whether or not said command buffer has a space of an amount according to the accessing type.

9. A multi CPU system according to claim 6, wherein each of said plurality of semaphore circuits issues a read command to the resource on said system bus not via said command buffer at a read access.

* * * * *